UNITED STATES PATENT OFFICE.

CLAUS A. SPRECKELS AND CHARLES A. KERN, OF NEW YORK, N. Y., ASSIGNORS TO FEDERAL REFINING COMPANY, OF JERSEY CITY, NEW JERSEY, A CORPORATION OF NEW JERSEY.

PROCESS OF PURIFYING SUGAR AND SOLUTIONS THEREOF.

SPECIFICATION forming part of Letters Patent No. 698,150, dated April 22, 1902.

Application filed November 14, 1901. Serial No. 82,193. (No specimens.)

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Processes of Purifying Sugar and Solutions Thereof, of which the following is a full and true description.

The object of this invention is to economically and quickly remove impurities from sugar or sugar solutions.

Prior to our invention efforts had been made to wash or cleanse a mass containing sugar, usually in the form of sugar-crystals, by treating the same with a saturated solution of sugar or with alcohol; but the saturated solution of sugar is only a non-solvent of the sugar when its full strength was maintained, and its use in any event resulted only in the transfer of a certain proportion of impurities from one body containing sugar to another of nearly equal quantity. The process of treating with alcohol was difficult to practice, owing to the volatile character of the material and the large losses necessarily incident to its use. Moreover, the percentage of refined sugar recovered or produced in both of the above attempts was unsatisfactory both in amount and in quality of product. We are also aware that it has been proposed to wash a mass containing sugar-crystals with a liquid consisting of a mixture of water and paraffin-oil; but the employment of paraffin-oil in such process was only for the purpose of diminishing the amount of water used, and so lessening the dissolving effect upon the sugar-crystals, and the mixtures had little or no effect upon the earthy or metallic salts or the invert sugar in the mass under treatment. We are further aware of the common practice of filtration of sugar liquor or dissolved sugar containing impurities through a mass of bone-black or other comminuted material for the special purpose of removing coloring-matter and which process incidentally partially removes other impurities; but it does not act to remove the invert sugar, which remains and interferes with final crystallization and forms molasses therein. The object of our invention is to avoid these tedious, expensive, and imperfect processes.

Our process is practiced by mixing the sugar or sugar solution with a defecating or cleansing composition produced by the action of sulfuric acid upon bodies such as resins, rosin-oils, essential oils, fats, fatty oils, and fatty acids in such proportions that there are no injurious effects upon the sugar from the sulfuric acid, and sulfonated or sulfooleaginous bodies, such as sulfonic acid or sulfonic-acid bodies, are produced which have greater affinity or absorbent properties for the earthy or metallic salts and for the invert sugar and caramel ordinarily found associated with sugar or sugar-bearing bodies than has the sugar itself, and subsequently separating the sugar from the defecating or cleansing composition containing the absorbed impurities.

We believe we are the first to discover the use of sulfonated or sulfooleaginous bodies, especially the recognized sulfonic acids or material containing the same, for the purpose of cleansing or purifying sugar or to employ a fluid non-solvent of sugar having an affinity for the ordinary sugar impurities greater than the adherent properties of such impurities to the sugar itself.

As an example of the way in which our cleansing material may be prepared for use we state as follows:

We mix sulfuric acid, preferably of 1.835 specific gravity, (66° Baumé,) or a mixture of acids containing sulfuric acid in the proportion of, say, fifty parts, by weight, of acid with one hundred parts, by weight, of one or more bodies, of which resinous bodies fats, fatty oils, and fatty acids and essential oils are examples. The sulfuric acid is added to the bodies gradually, so as to maintain a low temperature, and the mixture is allowed to stand for a few hours. The excess of acid is removed or neutralized either by the addition of alkali or by the addition of water or gravital separation. The proportion and strength of acid above suggested may be used in sulfonating each and every one of the substances hereinafter mentioned; but in the cases of essential oils, such as turpentine, it will be preferable to considerably increase the proportion of the oil to the sulfuric acid, even to the extent of doubling the same or more. The cleansing or defecating body produced is of course in all cases fluid. The proportion and strength of acid may of course be varied in well-known ways, and other well-known acids may be mixed with the sulfuric acid without departure from our invention, it being borne in mind that the result is that the body when acted upon by the sulfuric acid and in the condition in which it is to be used will not contain sulfuric acid in any amount injurious to the sugar and will have an affinity or absorbent property for the impurities greater than the adherent properties of such impurities for the sugar itself.

The following are bodies which we have tested and found to be acted upon and to act in the manner described, viz: colophonium, rosin, rosin-oil, olive-oil, castor-oil, cotton-seed oil, cocoanut-oil, linseed-oil, rape-oil, peanut-oil, lard, tallow, cod-liver oil, fish-oil, (menhaden-oil,) lard-oil, oleic acid, stearic acid, palmitic acid, butyric acid, oil of turpentine; but the substances above named are given as examples only of our invention.

Our invention also includes the employment of mixtures of two or more of such bodies. We have attained good results from a considerable number of such mixtures, of which the following may be cited as examples: first, rosin-oil, castor-oil, and oleic acid; second, castor-oil, cotton-seed oil, and oleic acid; third, lard and rosin-oil; fourth, rosin-oil, oleic acid, and oil of turpentine; fifth, tallow and oil of turpentine.

As most of the above-enumerated bodies are known as "oils" and as rosin is analogous to the fatty bodies for the purpose of our invention and as the fats are solid oils and as the fatty acids, as is well-known, have oily or greasy characteristics and as all of the above substances are acted upon by sulfuric acid in the manner described and also when sulfated act upon sugar and its impurities in analogous and equivalent ways, we hereinafter include them all under the generic term "oleaginous bodies," and when acted on by sulfuric acid in the manner described we term the derivatives "sulfoöleaginous bodies."

The action of sulfuric acid upon the various resinous, fatty, or oily bodies, examples of which are above given, while not identical is sufficiently similar to class all of these bodies together for the reasons above specified, and a resulting substance or compound is produced which does not contain sulfuric acid in a form which is harmful to sugar, but which has an affinity or absorbent quality for the mineral or earthy salts and for the invert sugar and the caramel, which are the impurities most generally associated with sugar, superior to the adherence of such impurities to the sugar itself.

The exact character of the reaction produced by sulfuric acid on the bodies named differs, of course, somewhat with the character of the body treated; but the resulting product is for the purposes of this invention essentially the same in all cases, and all the bodies above specified are equivalents for the purposes of our invention.

The amount of the composition used may be varied to suit the different qualities of the material being treated; but the mass of sugar-bearing material and cleanser should be semifluid at least, if not already so. In all cases there should of course be enough to absorb out the impurities. For example, we have obtained excellent results when treating raw sugar by employing eight pounds of cleanser to each ten pounds of raw sugar. As the composition has no injurious effects upon the sugar-crystals or sugar liquor, the quantity of composition may be increased as desired.

Our preferred method of separating the composition and impurities from sugar-crystals is as follows: After the intimate mixture of the cleansing material in liquid form and the sugar under treatment we preferably employ a centrifugal machine driven at a high rate of speed for the purpose of separation. The mixture of the composition and the material being treated is put into the centrifugal machine, and the composition and the absorbed impurities are expelled from the mass. This expelled mixture may subsequently be treated for the recovery therefrom of the cleanser. The solid substances, if any—such as sticks, stones, straw, &c.—still left with the sugar after separating out the composition and the impurities it has absorbed may be removed in any well-known manner, as by dissolving the mass of sugar-crystals in water and by the filtration hereinafter described. In order to remove any slight traces of our cleansing body or composition from a mass of sugar-crystals, we may subject the mass to a further treatment by dissolving the same, adding fullers' earth or a substitute therefor, and then filtering out the same and crystallizing the sugar.

If the material to be treated is in the form of sugar-juice, sugar liquor, or molasses, we mix the same with an amount of sulfoöleaginous body approximately equal in amount to the weight of the impurities as ascertained by chemical analysis of a portion of the liquor contained in the liquor in order to absorb out the impurities other than the solid impurities, and we then subject the mixture to any desired subsequent processes for filtering out the purified sugar liquor, as by the use of fullers' earth, above described by us, and for subsequent crystallization of the sugar.

If any of the cleansing-bodies utilized are in the form used at all soluble in water, they may nevertheless be readily availed of in connection with concentrated sugar solutions, as they are practically insoluble in such sugar solutions.

The above or any particular process for separating the cleanser from the sugar is, however, not an essential part of our generic invention, but forms of process for removing the cleansing-body are more fully described in separate applications, Serial Nos. 82,825 and 82,826, filed November 19, 1901.

It is obvious that our new method described and claimed herein is exceedingly economical and speedy in comparison with methods previously known or used for this purpose.

Our experiments have demonstrated that the removal of impurities from the material treated by our cleansing-body, as above set forth, is so thorough in connection with any known method of subsequent separation that practically all the sugar of the material treated is refined into white sugar and none is obtained in the form of refined brown sugar. It is also true that in the use of this method practically no invert sugar is formed, and so the loss due thereto is avoided.

Our present invention and application being of a generic nature we do not herein limit ourselves specifically to purifying sugar in the form of crystals by mixing therewith our cleansing agents and then separating such agents by the use of a centrifugal, as that special form of our generic invention with its special attendant advantages is made the subject-matter of an application filed November 19, 1901, Serial No. 82,825; nor do we limit ourselves specifically herein to the purifying of sugar in the form of a solution by the addition of our cleansing agents and then separating the same by filtration or by the aid of metallic salts, as the same with its attendant advantages as a form of our generic invention is specifically claimed in an application filed November 19, 1901, Serial No. 82,826.

We claim—

1. In the method of cleansing sugar from its impurities, the step which consists in mixing with the impure sugar a sulfonated fluid cleansing agent, substantially as described.

2. In the method of cleansing sugar from its impurities, the step which consists in mixing with the impure sugar a sulfoöleaginous body, substantially as described.

3. In the method of cleansing sugar from its impurities, the step which consists in mixing with the impure sugar a sulfonic-acid body, substantially as described.

4. In the method of cleansing sugar from its impurities, the step which consists in mixing with the impure sugar a sulfoöleaginous derivative of a resinous body, substantially as described.

5. The method of cleansing sugar from its impurities, consisting in mixing with the impure sugar a sulfoöleaginous body, substantially as described, and then separating the sulfoöleaginous body and impurities carried by it, from the sugar, substantially as described.

CLAUS A. SPRECKELS.
CHARLES A. KERN.

Witnesses:
WILLIAM W. COOK,
W. H. BERRIGAN, Jr.